J. A. BOZARTH.
GARDEN IMPLEMENT.
APPLICATION FILED JULY 18, 1914.
1,138,274.
Patented May 4, 1915.
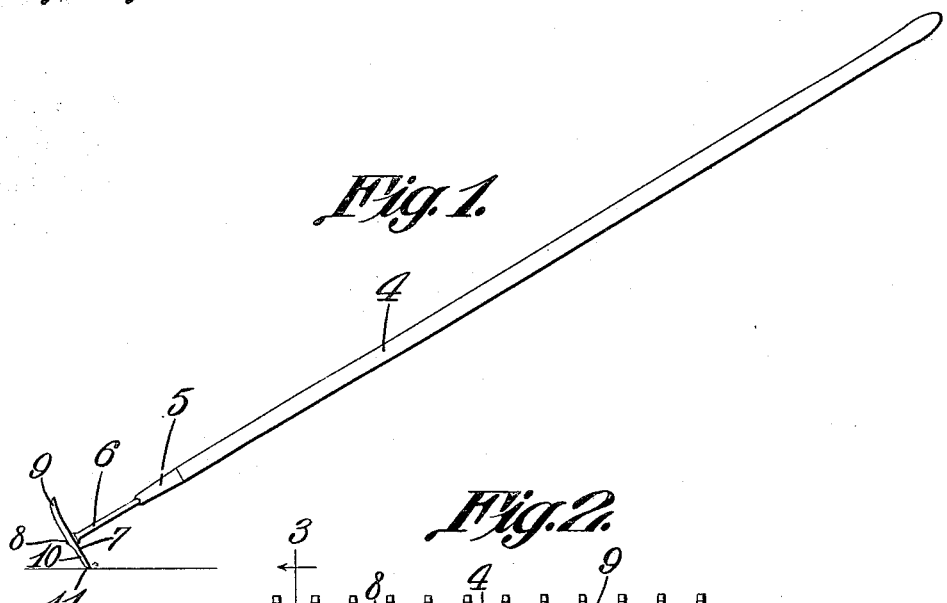
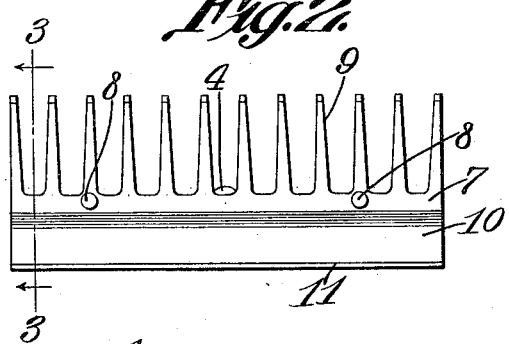
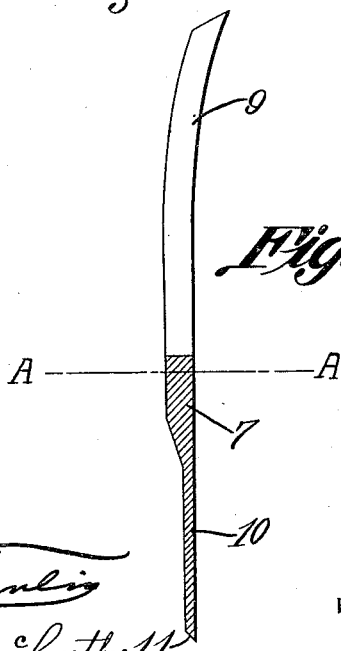
Witnesses
J. A. Bozarth, Inventor
by C. A. Snow & Co., Attorneys

UNITED STATES PATENT OFFICE.

JOHN ALEXANDER BOZARTH, OF EL PASO, TEXAS.

GARDEN IMPLEMENT.

1,138,274.  Specification of Letters Patent.  Patented May 4, 1915.

Application filed July 18, 1914. Serial No. 851,784.

*To all whom it may concern:*

Be it known that I, JOHN A. BOZARTH, a citizen of the United States, residing at El Paso, in the county of El Paso and State of Texas, have invented a new and useful Garden Implement, of which the following is a specification.

This invention relates to an improved form of garden implement.

The object of the present invention is to provide a combination rake and scraper and which may also be used in the capacity of hoe or allied implement. The blade is formed of a plate so cut and arranged that the prolongation of the handle will pass through the center of gravity of the blade, thus eliminating any tendency for the implement to rotate with the handle as an axis.

A further object of the invention is to provide a garden implement in which the blade is light in weight and so arranged that the handle may be loosely held and there will be no turning movement brought to bear upon the handle by the blade, regardless of the position of the latter.

A still further object of the invention is to provide a combined rake and scraper in which the scraper blade is cut away to thin dimensions, thus imparting a certain resiliency thereto and at the same time balancing the blade so that the prolongation of the handle axes will pass through the transverse center of gravity of the blade.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a view in side elevation of the implement illustrating the same as used as a scraper or hoe. Fig. 2 is a front view in elevation of the implement blade. Fig. 3 is cross sectional view taken on the line 3—3 of Fig. 2.

Referring to the drawings in which similar reference numerals designate corresponding parts throughout the several views, 4 represents a handle, of the conventional type, and to the lower end of which is secured the ferrule 5. A pair of arms 6 are secured to the ferrule 5 and project through and engage the blade 7, the rivet-like engagement being illustrated at 8 although it is to be noted that any usual and similar securing means may be employed. The blade 7 is formed as a plate, one edge of which is formed with a plurality of projecting prongs 9, thus forming a rake. The remote edge of the blade is cut away to form the thin scraping portion 10, the lower extremity of which is beveled as at 11 and at such an angle that it will rest substantially flat upon the ground when in active service as illustrated in Fig. 1.

The line A—A in Fig. 3 represents the prolongation of the axis of the handle 4 and the blade is so proportioned that the average sectional modulus of the rake forming portion illustrated, above the line A—A in Fig. 3, and the sectional modulus of the scraping of the blade, illustrated as lying below the line A—A in Fig. 3, are equal. The foregoing is effected by cutting away the scraping portion of the blade, (which, as has been mentioned, also lends certain resiliency to the blade) and proportioning the number of prongs 9, per unit length. The desired feature obtained by the foregoing, resides in the fact that the constant tendency for the blade to rotate in a given direction as found in the usual combined rake and scraper is eliminated. Thus, in using the implement as a scraper, the implement may be used with considerable violence, and although the handle be loosely held, there will be no turning movement exerted upon the handle by an unequal disposal of weight, or a preponderance of weight upon either side of the axis A—A. The average sectional modulus considered in cross section and lying above the line A—A refers to the summation of the sectional moduli taken through the prongs, and intermediate the prongs.

Although I am aware combined rakes and scrapers have been hereto constructed having the general configuration as disclosed in the present drawings, I am not aware that any attempt has been made to so proportion the average distribution of weight above and below the axis A as to provide a balance plate and with the moments of inertia of the scraping portion and rake portion of the blade, equal when considered about the prolongation of the axis handle.

Having thus fully described my invention, what I claim as new is:

An implement of the class described, comprising a blade, one portion of the said blade provided with a plurality of rake prongs, the opposite portion of said blade being cut away to thin proportions forming a scraper blade with a beveled lower extremity, and a handle carrying said blade and secured thereto with the prolongation of the handle axis passing through the longitudinal, and average sectional, center of the said blade.

In testimony that I claim the foregoing as my own, I have hereto affixed my signature in the presence of two witnesses.

JOHN ALEXANDER BOZARTH.

Witnesses:
 J. D. KAIGLER,
 H. O. DOVER.